United States Patent [19]

Nönnecke

[11] Patent Number: 4,538,537
[45] Date of Patent: Sep. 3, 1985

[54] SHIP HULL FOR SINGLE-SCREW VESSEL, TWIN-SCREW VESSEL WITH TWO AFTBODIES AND CATAMARAN

[76] Inventor: Ernst A. Nönnecke, Professor-Brix-Weg 2, 2000 Hamburg 50, Fed. Rep. of Germany

[21] Appl. No.: 363,617

[22] Filed: Mar. 30, 1982

[30] Foreign Application Priority Data

Apr. 28, 1981 [DE] Fed. Rep. of Germany ....... 3116727

[51] Int. Cl.³ ................................. B63B 1/08
[52] U.S. Cl. ..................... 114/57; 114/162; 440/66
[58] Field of Search ................ 114/56, 57, 67 R, 162; 440/79, 66, 69, 67

[56] References Cited

U.S. PATENT DOCUMENTS

| 3,455,263 | 7/1969 | Nonnecke | 114/57 |
| 3,635,186 | 1/1972 | German | 440/67 |
| 4,309,172 | 1/1982 | Narita et al. | 440/67 |
| 4,363,630 | 12/1982 | Di Vigano | 440/79 |

FOREIGN PATENT DOCUMENTS

| 2253761 | 5/1973 | Fed. Rep. of Germany | 114/56 |
| 474401 | 8/1969 | Sweden | 440/79 |
| 29623 | of 1907 | United Kingdom | 114/57 |
| 1115676 | 5/1968 | United Kingdom | 114/56 |

Primary Examiner—Trygve M. Blix
Assistant Examiner—Stephen P. Avila
Attorney, Agent, or Firm—Toren, McGeady, Stanger, Goldberg & Kiel

[57] ABSTRACT

An asymmetric aftbody for the hull of a ship having a twisted shape operative to achieve higher efficiency at practically all aftbody block coefficients by improving water flow and adapted to provide a shape wherein the tangential components of the wake are distributed as favorably as possible over the entire propeller circumference, the aftbody having an upper part above the propeller shaft which is combined with a part of the hull below the propeller shaft, the sectional areas of the hull having a bulbous or a U-shaped configuration with the center lines of the sectional areas being inclined away from the vertical longitudinal plane through the propeller center in opposite directions to that of propeller rotation such that when seen from aft the bulbous or U-shaped stern below the propeller shaft forms an angle of inclination with the vertical longitudinal plane in a direction opposite to that of propeller rotation.

9 Claims, 9 Drawing Figures

SHIP HULL FOR SINGLE-SCREW VESSEL, TWIN-SCREW VESSEL WITH TWO AFTBODIES AND CATAMARAN

BACKGROUND OF THE INVENTION

The invention refers to a hull for a single-screw vessel, a twin-screw vessel with two aftbodies and a catamaran for all Froude numbers and block coefficients, respectively, as usual in merchant shipping.

In conventional hulls for single-screw vessels with a symmetric aftbody form at portside and starboardside it is not possible to influence the water line entry angles differently at the two ship's sides.

As the flow to the propeller is appreciably worse on that side of the ship on which the propeller blades move upwards than on the other side, it is possible to improve the flow to the propeller and the propulsion efficiency by an asymmetric aftbody design. Such an asymmetric aftbody form is described in the Patent Specification DE-PS No. 12 07 820. According to this patent a hull for a single-screw vessel or a vessel with a central screw with a low Froude number and a correspondingly high block coefficient is provided with an asymmetric aftbody shape in such a way that the part above the propeller shaft is twisted in relation to the part below the propeller shaft opposite to the direction of propeller rotation. Thus in way of the propeller post the centre line of the horizontal sections through the hull are inclined away from the longitudinal median plane contrary to the direction of the propeller rotation—this inclination increasing from the roots of the propeller blades to the ends of the blades—so that when seen from aft the propeller post above the propeller shaft forms an angle of inclination with the longitudinal median plane in the opposite direction to that of propeller rotation.

This known hull form was primarily developed for vessels with high block coefficients to improve the flow to the propeller and to increase the aftbody block coefficient as compared with symmetric aftbodies without a reduction of the propeller efficiency. Or, if the block coefficient or the displacement of the aftbody, respectively, remains unchanged, either an increase of speed, or at the same speed, a reduction of propulsion power and thus of fuel consumption could be achieved.

Model tests with various vessels with this known aftbody form resulted in savings of propulsion power or fuel between 5 and 7%. At these vessels the part above the propeller shaft of the aftbody was twisted in relation to the part below the propeller shaft opposite to the direction of propeller rotation, and a conventional U-shaped frame character below the propeller shaft resulted in lines of the isotachs of wake which in this area came very close to the ideal of rotational symmetry. This refers to vessels with block coefficients between abt. 0.75 and 0.83. With respect to faster vessels lying in the range of higher Froude numers and lower block coefficients, it is known that the lines of isotachs can be influenced more favourably by arranging the known stern bulbs. With such stern bulb forms or U-shaped frames below the propellers shaft it is, however, not possible to impart an additional rotation to the water flowing towards the propeller.

It is also known that compared with the symmetric aft body form the asymmetric form exerts a favourable influence on the course behavior and the resistance of the vessel due to the fact that the pressure point of the propeller is shifted towards the centre-line, so that the angle of attack of the rudder for the straight-away course is negligibly small.

For economic reasons it is often advisable to use propellers with maximum diameters and a correspondingly low number of revolutions to attain an improvement in efficiency and a reduction of power or fuel consumption, respectively. Propellers with extremely large diameters in relation to the draft and an insufficient immersion of the blades (in the 12 o'clock position), however, imply the danger that air is sucked in by the propeller resulting in deteriorated wake conditions, vibration-generating forces and cavitation, etc.

To avoid these adverse effects tunnelled aftbodies, guide plates or propeller nozzles were successfully arranged depending upon the particular type of vessel, her block coefficient and speed. Also in case of normally immersed propellers and adequate speeds nozzles are applied which surround the propeller or are installed forward of the propeller on the hull.

For certain ship types, for instance for single-screw Ro-Ro vessels, the arrangement of the engine plant and propeller shaft on one side of the ship can bring about significant technical advantages, as for instance the arrangement of the loading ramp beside the engine room and the like, and this may result in different grades of fineness or block coefficients, respectively, on either side of the aftbody.

BRIEF SUMMARY OF THE INVENTION

As against these known designs as described above it is the object of the present invention to improve the known asymmetric aftbody form in such a way that a reduction of power and consequently of fuel oil is achieved for practically all aftbody block coefficients by improving the water flow to the screw, where the aftbody has such a shape that the tangential components of the wake are distributed as favourably as possible over the entire propeller disc plane, while the wake distribution and rotational effect come as close as possible to the ideal of rotational symmetry in order to attain a power reduction and to diminish at the same time the hydrodynamic forces of the propeller to a minimum.

To solve this task it is proposed to design a hull for a single-screw vessel, a twin-screw vessel with two aftbodies or a catamaran as described above according to the invention in such a way that the part of the aftbody above the propeller shaft has an asymmetric form and is combined with an asymmetric and/or twisted part of the aftbody having a bulbous or U-shape below the propeller shaft.

BRIEF DESCRIPTION OF THE DRAWINGS

The invention is described in detail with reference to the accompanying drawings, wherein.

DETAILED DESCRIPTION OF THE PREFERRED EMBODIMENTS

Figure 1:
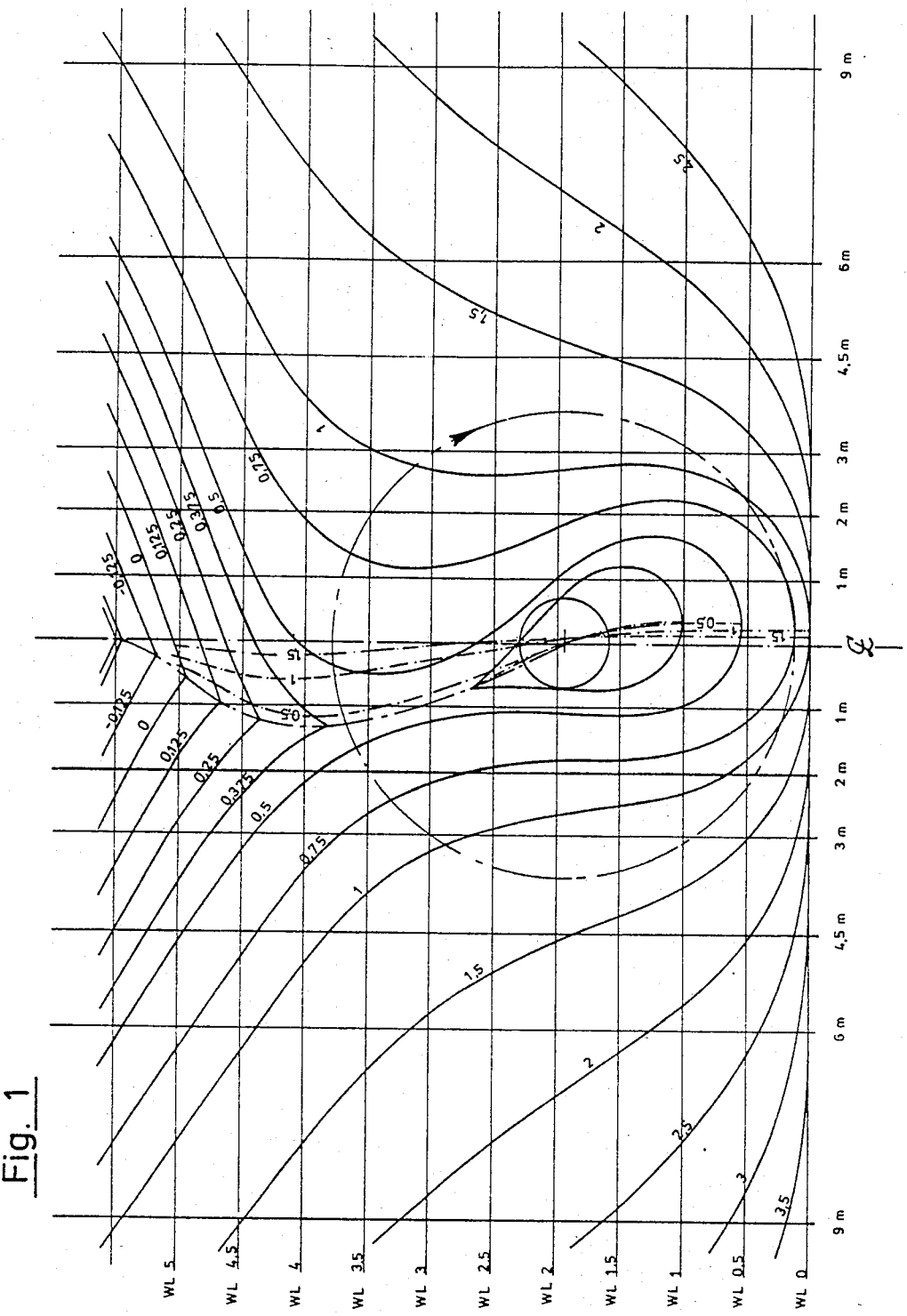
FIG. 1 is a rear view of the hull construction according to the present invention.
Figure 2:
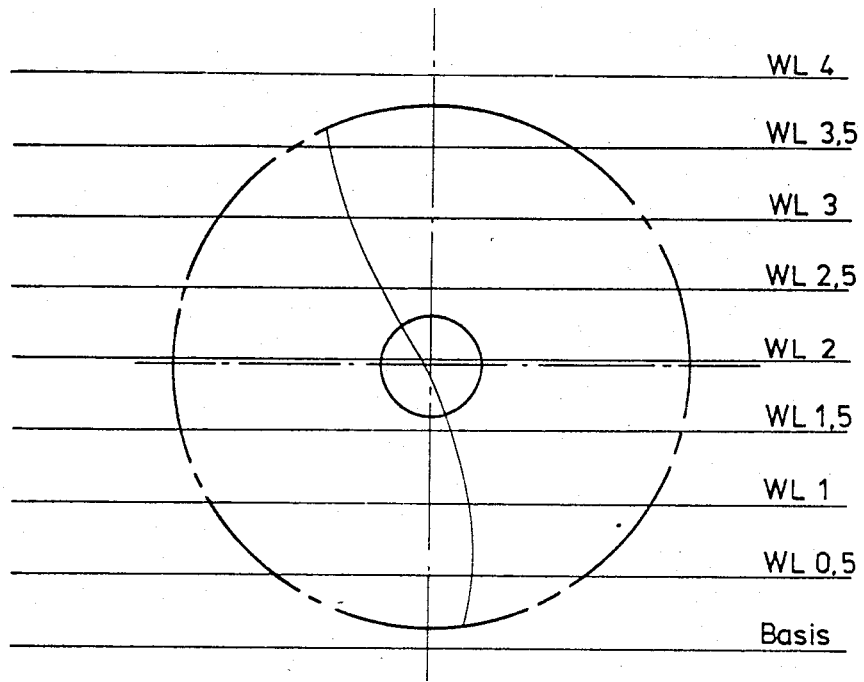
FIG. 2 shows the "ideal run" of the propeller post in way of the propeller disk.
Figure 3:
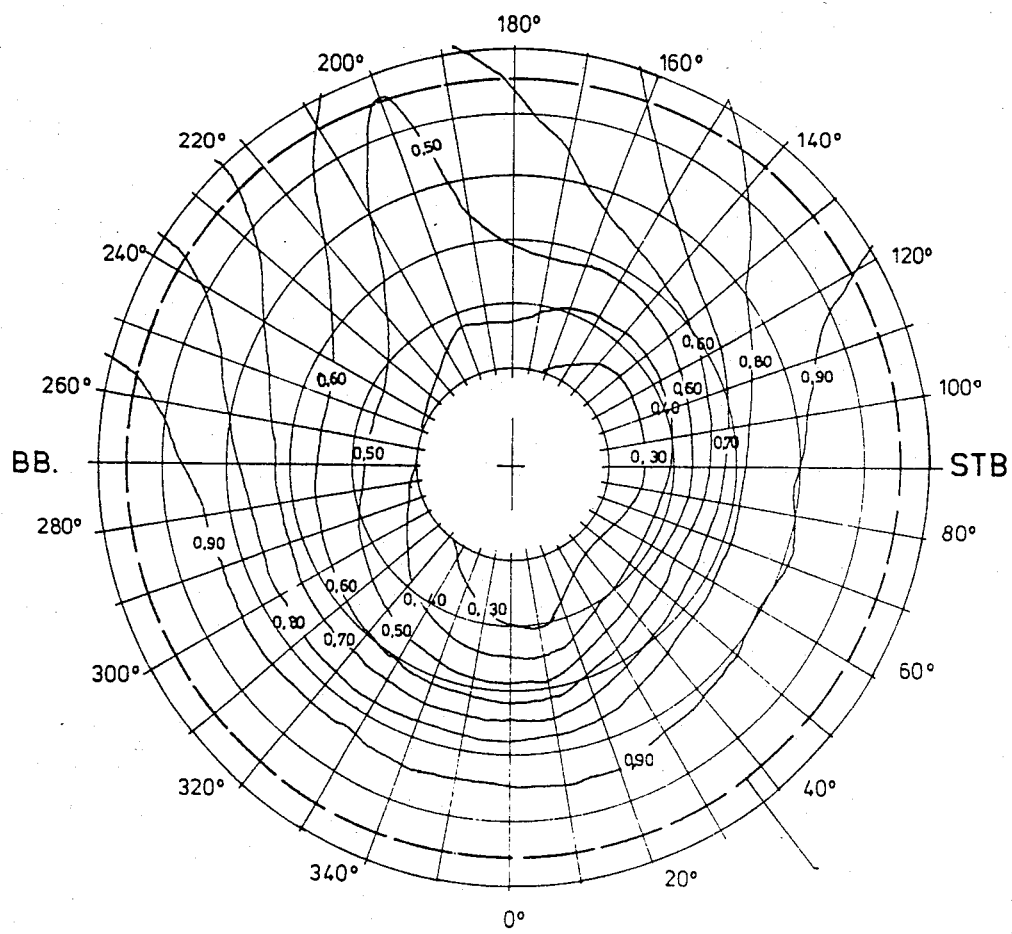
FIG. 3 shows the typical line of isotachs of the axial wake according to the 3-D-measurement of the container vessel with an aftbody according to the invention.
Figure 4:
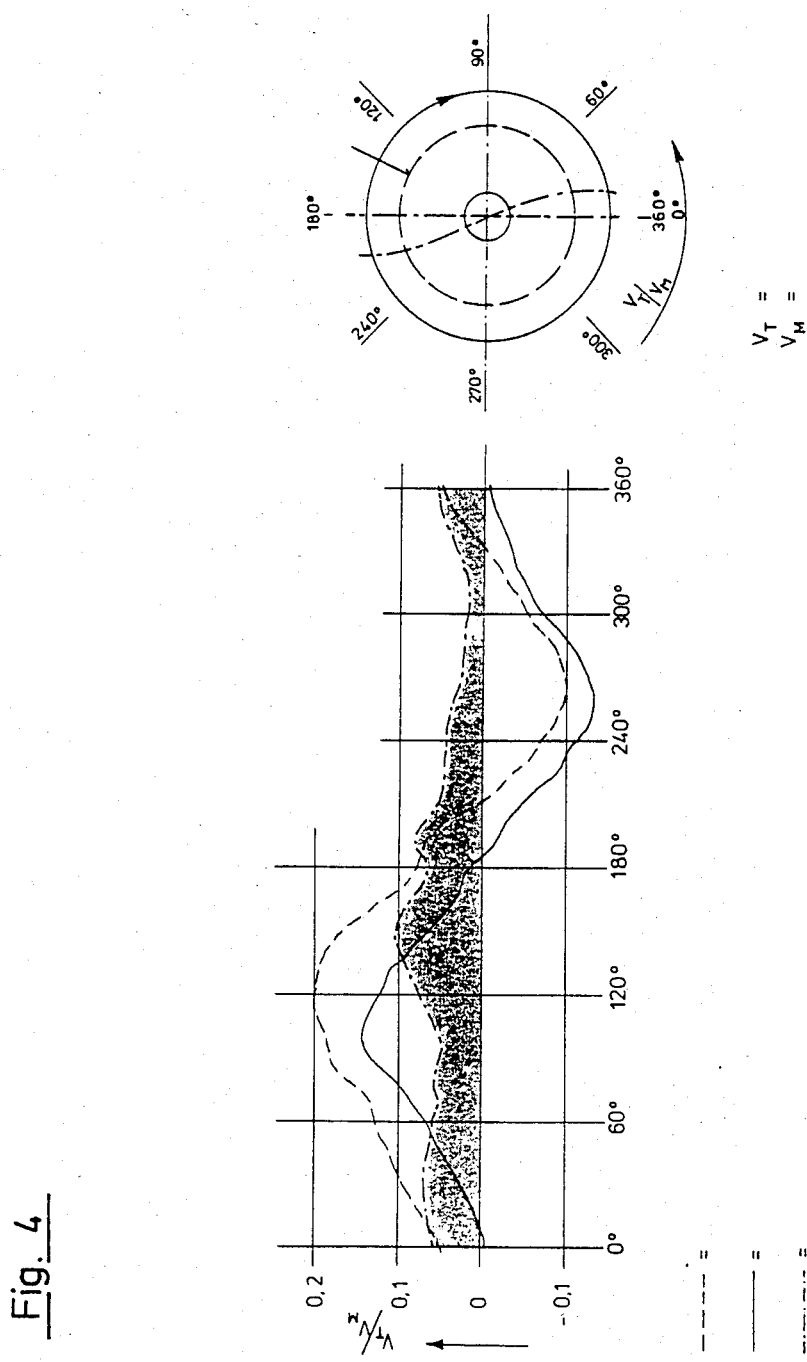
FIG. 4 shows the rotational effect contrary to the direction of propeller rotation resulting from a comparison of the tangential components according to 3-D-measurements of a container vessel with a symmetric aftbody modified according to the invention. Here the tangential speed is related to the model speed.

According to the invention a solution of the task sought to be overcome is to design the aftbody or the aftbodies asymmetrically or twisted so that the part above the propeller shaft of the aftbody is twisted in opposite direction to the direction of propeller rotation and the center lines of the horizontal sections through the hull in way of the propeller well are inclined away from the longitudinal median plane through the propeller center in the opposite direction to that of propeller rotation—this inclination increasing from the roots of the propeller blades to the ends of the blades—in such a way that, when seen from aft, the propeller post above the propeller shaft forms an angle of inclination with the longitudinal median plane through the propeller center in the opposite direction to that of propeller rotation, and this upper part is combined with a part below the propeller shaft of the aftbody, the sectional areas of which are asymmetric and/or twisted and have a bulbous or U-shape and the center lines of the sectional areas are inclined away from the longitudinal median plane through the propeller center in the opposite direction to that of the propeller rotation—this inclination increasing from the roots of the propeller blades to the ends of the blades—in such a way that, when seen from aft the stern below, the propeller shaft of a bulbous or U-shape forms an angle of inclination with the longitudinal median plane in the opposite direction to that of propeller rotation.

When it is assumed that the center lines of the horizontal sections below the propeller shaft are lengthened in the aft direction and projected onto the propeller plane, the angle between the imaginary stern and the vertical is correspondingly larger in this area.

In the longitudinal direction, this hull form extends over an important area of the aftbody. The center lines of the vertical sections through the aftbody therefore have an S-shaped character which increases in the aft direction with the bulges above and below the propeller shaft pointing in the opposite direction to that of the propeller rotation.

According to the invention, the ship's hull has a twisted and/or asymmetric form where the twisted center lines of the vertical sections intersect the longitudinal median plane, and the center lines of the horizontal sections have a curved shape and migrate contrary to the direction of propeller rotation in the aft direction above the propeller shaft to one ship's side and below it to the other side. The water flow seen in the horizontal plane intersects the longitudinal median plane of the vessel above the propeller shaft to one ship's side and below the propeller shaft to the other side.

At the aftbody according to the invention with a propeller turning clockwise, a large quantity of water flows from starboardside to portside above the propeller shaft and initiates a rotational effect. The V-shaped character of the frames at portside increases this effect of rotation and imparts a more or less significant vertical component to the flow. The arrangement of a twisted stern bulb or twisted U-shaped frames below the propeller shaft improves the rotational effect in this area considerably.

In model tests carried out with a hull in accordance with the invention where the part above the propeller shaft of the aftbody was asymmetric and combined with an asymmetric or twisted bulbous bow, respectively, arranged below the propeller shaft, power savings of up to about 8% could be ascertained by applying this hull form to fast container vessels with low block coefficients ($C_b = 0.55$). In view of the fuel oil prices, the high economic value of this hull form is thus obvious. Additional model tests in which the wake was measured three-dimensionally under different conditions resulted in an extremely favorable wake distribution. Moreover, in a comparison of the tangential components of the wake with those of a symmetric model with identical main data and curve of sectional areas, it could be proven that the generated prerotation extended over the entire propeller disc plane. Additionally, the hull form was tested in model tests with a catamaran with a block coefficient of $C_b = 0.52$. Compared with other tests carried out with catamarans and twin-screw vessels lying in a similar range of Froude numbers, the propulsion test results as well as the wake measurements were excellent.

Further advantageous embodiments of the invention are shown in the drawings referring to combinations of the aftbody form according to the invention with tunnels, guide plates or propeller nozzles and with propellers and rudders shifted to one ship's side resulting in improvements of propulsion efficiency and maneuverability.

FIG. 1 shows a typical body plan of an aftbody according to the invention for a high speed vessel with a twisted bulb below the propeller shaft. The S-shaped center lines of the vertical sections are fanning above the propeller shaft to one ship's side and below it to the other side opposite to the direction of propeller rotation.

Figure 5:
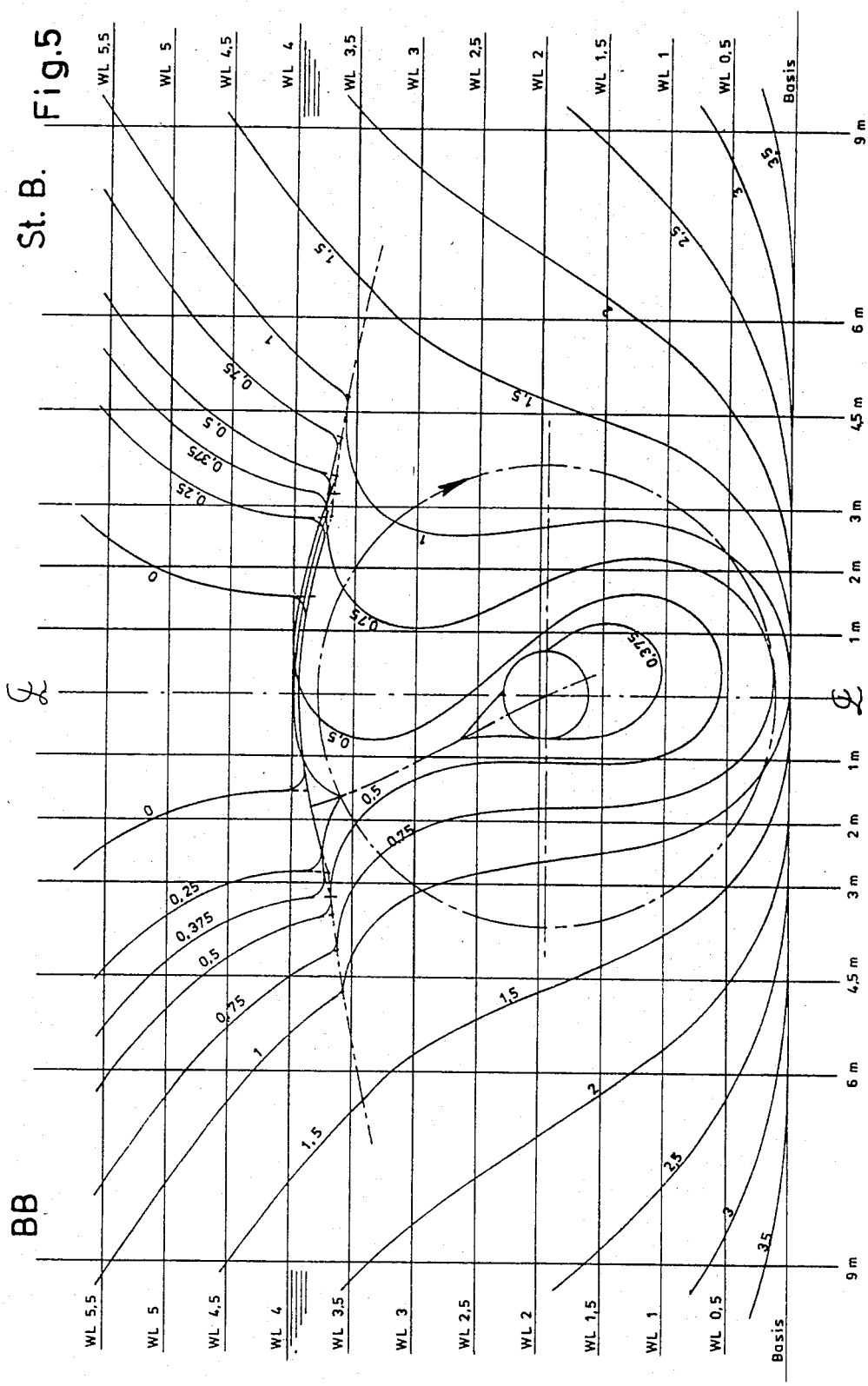
FIG. 5 is a rear view of a hull construction similar to that of FIG. 1, but with some modifications.
Figure 6:
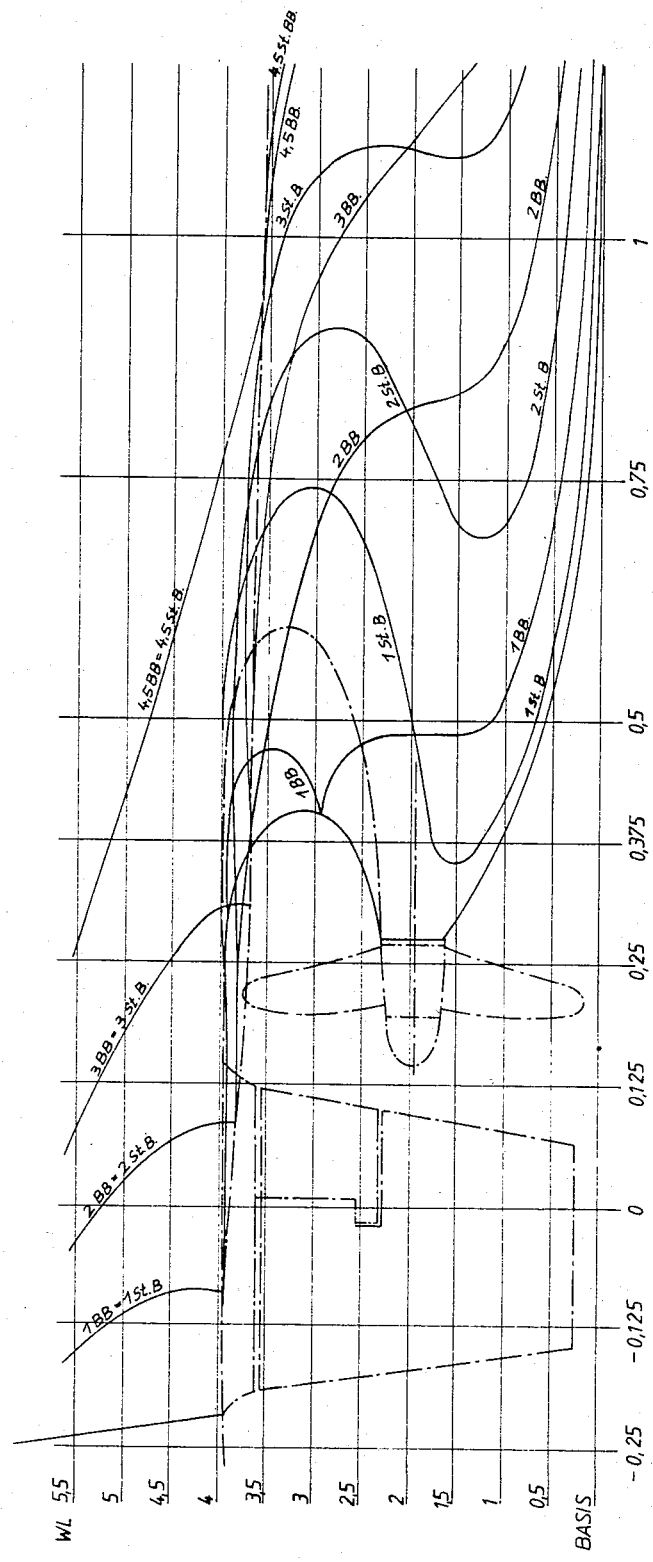
FIG. 6 is a side view of the hull in accordance with the body plan of FIG. 5.

With reference to FIG. 5, there is shown a body plan of an aftbody according to the invention with an extremely large diameter in relation to the draft below a slight propeller tunnel. This tunnel can have a more or less prominent shape depending upon the particular requirements, so that it encloses the propeller to a large degree and/or extends over a greater length of the aftbody.

Figure 7:
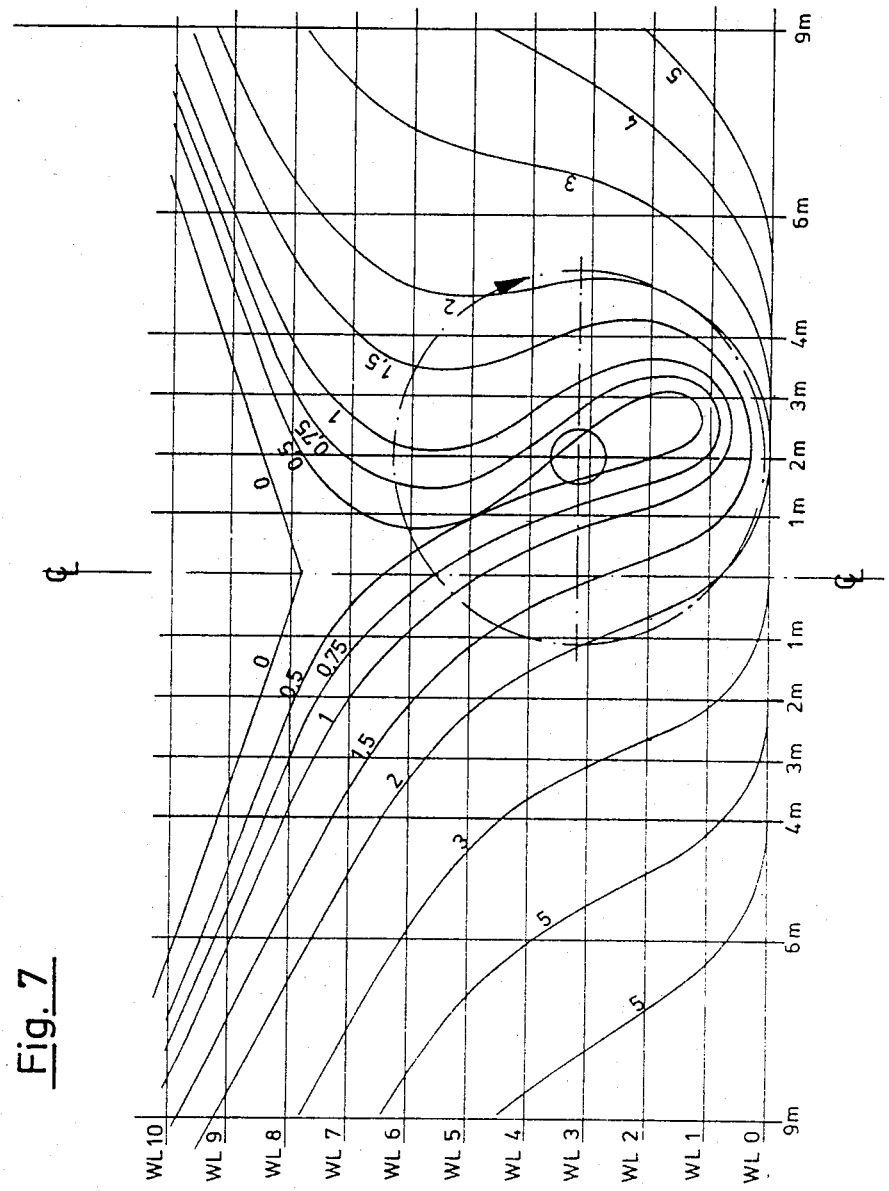
FIG. 7 is a rear view of a hull construction in accordance with a further embodiment of the invention.

FIG. 7 shows the body plan of an aftbody according to the invention with a propeller arranged on one ship's side. Here, for example, the frame shape and the stern below the propeller shaft have a slight bulb form or are U-shaped, respectively.

Figure 8:
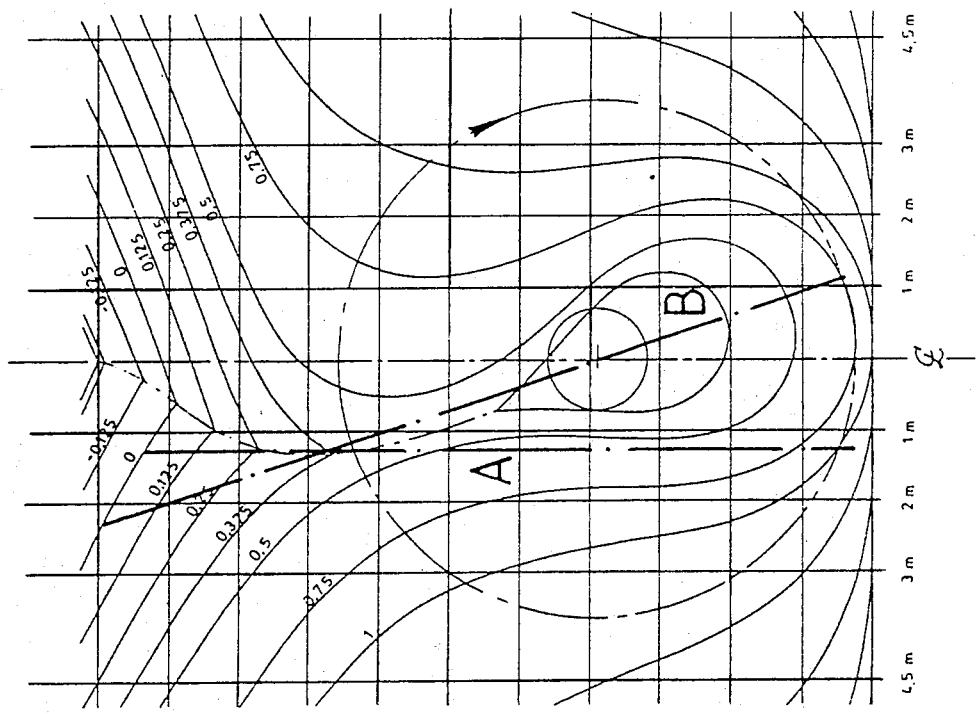

In FIG. 8, there is shown two typical rudder arrangements aft of the asymmetric aftbody. The line marked "A" shows the axis of a rudder shifted parallelly to the vertical longitudinal median plane. The line marked "B" shows the axis of a rudder inclined approximately in the direction of the propeller post.

Figure 9:
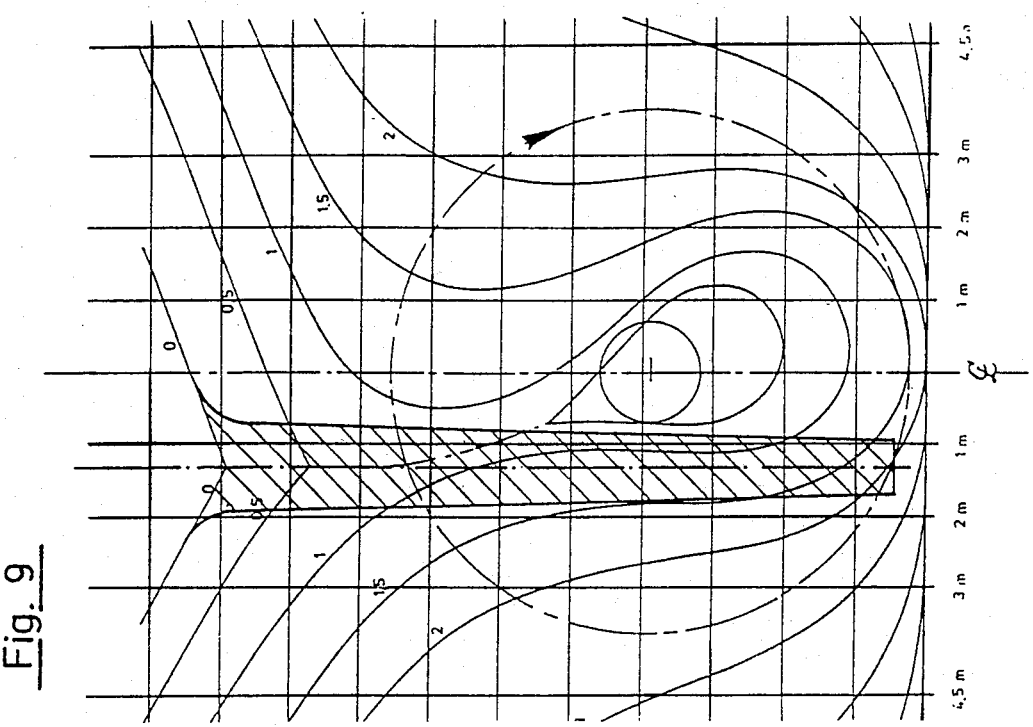
FIGS. 8 and 9 are each a rear view of hull constructions in accordance with further modifications in accordance with the invention.

In FIG. 9, there is shown a rudder of an asymmetric aftbody shifted parallelly to the longitudinal median plane while the stern above the rudder is shifted accordingly.

While specific embodiments of the invention have been shown and described in detail to illustrate the application of the inventive principles, it will be understood that the invention may be embodied otherwise without departing from such principles.

What is claimed is:

1. In a hull for a ship having a single screw-propeller including a hull stern body formation which is nonsymmetrical in that the part of the stern lying above the propeller shaft extends inwardly counter to the direction of propeller rotation in relation to the part lying below the propeller shaft on only one side of said stern body so that in the zone of the propeller aperture the center lines of the horizontal sections through the hull are inclined away from the longitudinal medium plane of the ship in a direction counter to the direction of rotation of the propeller, this inclination increasing from the zone of the root of the propeller blades to that opposite the ends of the blades in such a way that, seen from the stern, the stern frame above the propeller shaft forms with the longitudinal median plane an angle inclined away from the direction of rotation of the propeller, the improvement comprising that:

said upper part is combined with a part of said hull below said propeller shaft, the sectional areas of which hull are twisted and have one of a U-shaped and bulbous configuration, said center lines of said sectional areas being inclined away from said longitudinal median plane through said propeller center in a direction opposite to that of said propeller rotation, said inclination increasing from the roots of said propeller blades to the ends of said blades in such a way that, when seen from aft, the stern below said propeller shaft forms an angle of inclination with said longitudinal median plane in a direction opposite to that of propeller rotation; and that said sectional areas have S-shaped center lines which are fanned to one ship's side above said propeller shaft and to the other ship's side below said propeller shaft opposite to the direction of propeller rotation, said fanning effect increasing from the area of said propeller shaft outwards to the area of the propeller diameter in the aft direction to the stern.

2. A hull according to claim 1 wherein said S-shaped center lines of said sectional areas intersect said longitudinal median plane through said propeller shaft in the vicinity of the center of the shaft line with the intersections declining.

3. A hull according to claim 1 wherein said S-shaped center lines of said sectional areas intersect said longitudinal median plane through said propeller shaft in the vicinity of the center of the shaft line with the intersections running at the same level.

4. A hull according to claim 1 wherein said S-shaped center lines of said sectional areas intersect said longitudinal median plane through said propeller shaft in the vicinity of the center of the shaft line with the intersections rising in aft direction.

5. A hull according to claim 1 wherein said hull is provided with guide plates arranged at least at one side of said hull stern body.

6. A hull according to claim 1 wherein said hull is provided with said propeller arranged off-center.

7. A hull according to claim 1 wherein said vessel comprises a rudder whose axis aft of said propeller is shifted to one ship's side parallel to said longitudinal median plane.

8. A hull according to claim 7 wherein said axis of said rudder aft of said propeller is inclined so that it is arranged approximately in the direction of said propeller shaft.

9. A hull according to claim 1 wherein said vessel comprises at least one rudder arranged beside said propeller on one of the port side and starboard side thereof.

* * * * *